A. GRYGLEWICZ.
LIQUID FUEL BURNER.
APPLICATION FILED NOV. 14, 1917.
1,280,017.
Patented Sept. 24, 1918.
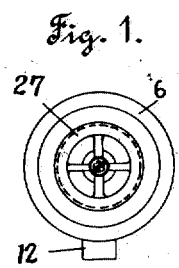
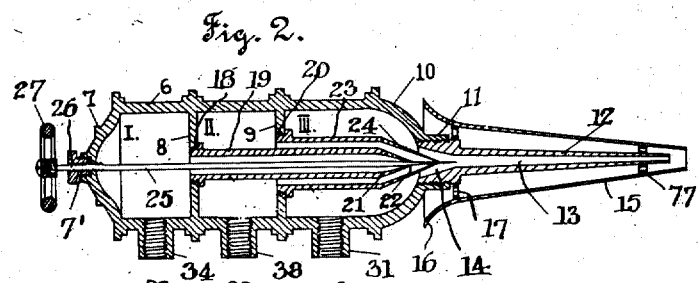
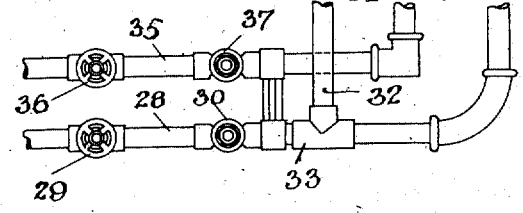
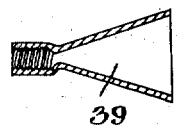
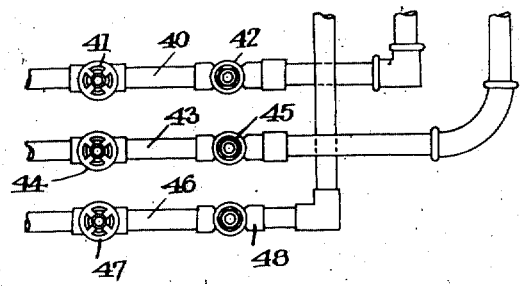
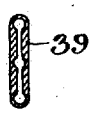
Inventor
Andrzej Gryglewicz.
By
Attorney

UNITED STATES PATENT OFFICE.

ANDRZEJ GRYGLEWICZ, OF WARSAW, RUSSIA.

LIQUID-FUEL BURNER.

1,280,017.    Specification of Letters Patent.    Patented Sept. 24, 1918.

Application filed November 14, 1917.   Serial No. 202,045.

*To all whom it may concern:*

Be it known that I, ANDRZEJ GRYGLEWICZ, a technicist, a citizen of Russia, residing at Warsaw, Poland, temporarily at 138 Sadovaja, Samara, Russia, have invented certain new and useful Improvements in Liquid-Fuel Burners, of which the following is a specification.

My invention relates to a liquid fuel burner.

An important object of the invention is to provide a burner of the above mentioned character having means to thoroughly heat and vaporize a liquid fuel, and intimately mix the same with the air.

Other objects and advantages of the invention will be apparent during the course of the following description.

In the accompanying drawings, forming a part of this specification, and in which like numerals are employed to designate like parts throughout the same, Figure 1 is a rear end elevation of the burner, Fig. 2 is a central vertical longitudinal section through the same, Fig. 3 is a side elevation of a different form of pipe connections, Fig. 4 is a longitudinal section through a different form of burner tip, and, Fig. 5 is a transverse section through the same.

In the drawings, wherein for the purpose of illustration is shown a preferred embodiment of my invention, the numeral 6 designates a cylindrical shell or casing, the rear end of which is covered by a head 7, carrying a stuffing box 7', as shown. The shell or casing 6 is provided with transverse partitions 8 and 9, and at its forward end with a tapered head 10. These partitions provide chambers I, II, and III, as shown. The tapered head 10 is provided with a screw-threaded tubular extension 11, receiving the rear screw-threaded end of an outlet tube 12. This outlet tube has a bore 13, which decreases in diameter forwardly, and has its rear end discharging into a conical recess 14, also decreasing in diameter forwardly.

Surrounding the outlet tube 12 in spaced relation is an air conducting sleeve 15, which is tapered and decreases in diameter forwardly. The rear end of this sleeve is flared, as shown at 16. The air conducting sleeve 15 is secured to the outlet tube 12, by means of apertured spacing rings 17, as shown.

The partition 8 has a screw-threaded opening 18, which receives the rear end of a mixing tube 19, which extends through a screw-threaded opening 20, formed in the partition 9, as shown. The forward end of the mixing tube 19 is tapered, as shown at 21, and this tapered end is apertured, as shown at 22. The numeral 23 designates a second mixing tube, having a substantially larger diameter than the first named mixing tube, and having its rear end screw-threaded within the opening 20. The forward end of the mixing tube 23 is tapered, and this tapered end is apertured, as shown at 24. The tapered end of the mixing tube 23 projects into the conical recess 14.

The numeral 25 designates a needle valve, tapering forwardly and operating within the apertures 22 and 24, to more or less completely or partly close the same. The rear portion of this needle valve is screw-threaded, as shown at 26, and engages within the stuffing box 7'. The needle valve 25 has a hand wheel 27 rigidly secured to the rear end thereof, to turn the same, and effect its longitudinal travel.

The numeral 28 designates a pipe adapted to supply a heated vapor, such as steam to the burner. This pipe is equipped with a cut off valve 29 and a check valve 30, which opens toward the burner. The forward end of the pipe 28 is adapted for connection with a tubular coupling 31, discharging into the chamber III. A branch pipe 32 is connected with the pipe 28, by means of a coupling 33, and is adapted for connection with a tubular coupling 34, which leads into the chamber I. Arranged near the pipe 28 is a pipe 35, having a cut off valve 36 connected therein, and also provided with a check valve 37, which opens toward the burner. The pipe 35 is adapted for connection with a tubular coupling 38, which leads into the chamber II.

In the operation of the apparatus, heated vapor or steam is fed through the pipe 28, under suitable pressure, and enters the chambers I and III. The liquid fuel, such as heavy oil, is fed through the pipe 35, under suitable pressure, and is discharged into the chamber II. The liquid fuel passes from its chamber in a tubular form through the annular space occurring between said mixing tubes 19 and 23, while the heated vapor or steam within the chamber I discharges through the mixing tube 19 into the tubular mass of fuel, and the heated vapor or steam within the chamber III discharges into the conical recess 14, in the form of a tube to envelop the tubular spray or mass of fuel. The more or less vaporized liquid fuel, with the steam inwardly and outwardly of the same, discharges into and through the outlet tube 12, as is obvious. The discharge of this mixture from the tube 12 draws air through the air conducting sleeve 15, which is in the form of a tube to envelop said mixture. The discharging mixture is burned as it leaves the tube 12, and the sleeve 15 provides a conical flame. If it should be desired to provide a flat flame, a tip 39, shown in Figs. 4 and 5, may be secured to the sleeve 15.

In Fig. 3 I have shown a different form of pipe connections. In this figure the numeral 40 designates an oil supply pipe, having a cut off valve 41 connected therein, and a check valve 42, adapted to open forwardly. The pipe 40 is adapted to be substituted for pipe 35, and is therefore connected with the coupling 38. The numeral 43 designates a hot vapor or steam supply pipe, having a cut off valve 44, and a check valve 45, adapted to open forwardly. The pipe 43 is adapted to be substituted for the pipe 28 and is connected with the tubular coupling 31. The numeral 46 designates an air supply pipe, having a cut off valve 47, and a check valve 48, adapted to open forwardly. The pipe 46 is substituted for the pipe 32, and is therefore connected with the coupling 34.

When the apparatus is operated with this form of pipe connection, air under suitable pressure is fed into the chamber I, while oil under suitable pressure is fed into the chamber II, and steam under suitable pressure is fed into the chamber III. The mixture which is discharged through the outlet tube 12 contains a central portion of air, surrounded by a tubular portion of vaporized liquid fuel, in turn surrounded by a tubular portion of heated vapor or steam.

It is to be understood that the form of my invention herewith shown and described is to be taken as a preferred example of the same, and that various changes may be resorted to in the shape, size, and arrangement of parts, without departing from the spirit of the invention or the scope of the subjoined claims.

Having thus described my invention what I claim is:

1. A burner of the character described, comprising a shell having a plurality of transverse partitions for dividing said shell into an intermediate chamber and two end chambers, a pair of mixing tubes connected with the partitions and leading into the intermediate chamber and one end chamber and having their forward ends tapered and apertured, an outlet tube connected with the other end chamber and having a tapered recess receiving the tapered end of the outer mixing tube, a common needle valve operating within the apertured tapered ends of the mixing tubes, means to supply a fuel to the intermediate chamber, and means to supply gases to the outer chambers.

2. A burner of the character described, comprising a shell having a plurality of transverse partitions for dividing said shell into an intermediate chamber and two end chambers, a pair of mixing tubes connected with the partitions and leading into the intermediate chamber and one end chamber, said mixing tubes being arranged in telescoping relation and having their forward ends apertured, an outlet tube connected with the other end chamber and having its rear end receiving the forward end of the outer mixing tube, a common needle valve operating within the apertured ends of the mixing tubes, means to supply fuel to the intermediate chamber, means to supply gases to the outer chambers, and an air supply sleeve surrounding the outlet tube in spaced relation and having its opposite ends open.

In testimony whereof I have affixed my signature in presence of two witnesses.

ANDRZEJ GRYGLEWICZ.

Witnesses:
R. LOVIAGUINE,
AUG. MIGHIS.